(12) United States Patent
Arakawa

(10) Patent No.: US 7,532,349 B2
(45) Date of Patent: May 12, 2009

(54) IMAGE PROCESSING METHOD, IMAGE PROCESSING APPARATUS, STORAGE MEDIUM, PROGRAM, AND COLOR IMAGE FORMING SYSTEM

(75) Inventor: Naoto Arakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1014 days.

(21) Appl. No.: 10/347,684

(22) Filed: Jan. 22, 2003

(65) Prior Publication Data

US 2003/0142330 A1 Jul. 31, 2003

(30) Foreign Application Priority Data

Jan. 25, 2002 (JP) ............... 2002-016921
Jan. 25, 2002 (JP) ............... 2002-016979

(51) Int. Cl.
 G06K 15/02 (2006.01)
 G06F 3/12 (2006.01)
 G06F 15/00 (2006.01)
(52) U.S. Cl. ............ 358/1.16; 358/1.15; 358/1.9
(58) Field of Classification Search .......... 358/1.15, 358/1.16, 1.9
 See application file for complete search history.

(56) References Cited

U.S. PATENT DOCUMENTS 6,550,382 B1   4/2003   Kouyama et al.
6,633,400 B1 * 10/2003   Sasaki et al. ........... 358/1.15
2002/0054339 A1  5/2002   Arakawa ............... 358/1.15

FOREIGN PATENT DOCUMENTS

| | | |
|---|---|---|
| JP | 63-197298 | 8/1988 |
| JP | 64-88820 | 4/1989 |
| JP | 7-230367 | 8/1995 |
| JP | 8-328770 | 12/1996 |
| JP | 9-6315 | 1/1997 |
| JP | 9-326938 | 12/1997 |
| JP | 11-175284 | 7/1999 |
| JP | 11-219269 | 8/1999 |
| JP | 2000-347820 | 12/2000 |
| JP | 2001-14124 | 1/2001 |
| JP | 2001-30583 A | 2/2001 |
| JP | 2001-45313 A | 2/2001 |
| JP | 2001-150737 | 6/2001 |
| JP | 2001-202221 A | 7/2001 |
| JP | 2001-306775 A | 11/2001 |

* cited by examiner

Primary Examiner—Edward L Coles
Assistant Examiner—Thomas J Lett
(74) Attorney, Agent, or Firm—Fitzpatrick, Cella, Harper & Scinto

(57) ABSTRACT

In an image processing method which is executed in an image processing system to which a client computer and a color image forming apparatus are connected, profile administration data of the color image forming apparatus is received, and, when it is judged based on the received profile administration data that a predetermined output profile does not already exist locally, the predetermined output profile is registered in the color image forming apparatus, whereby profile administration can be effectively performed.

16 Claims, 7 Drawing Sheets

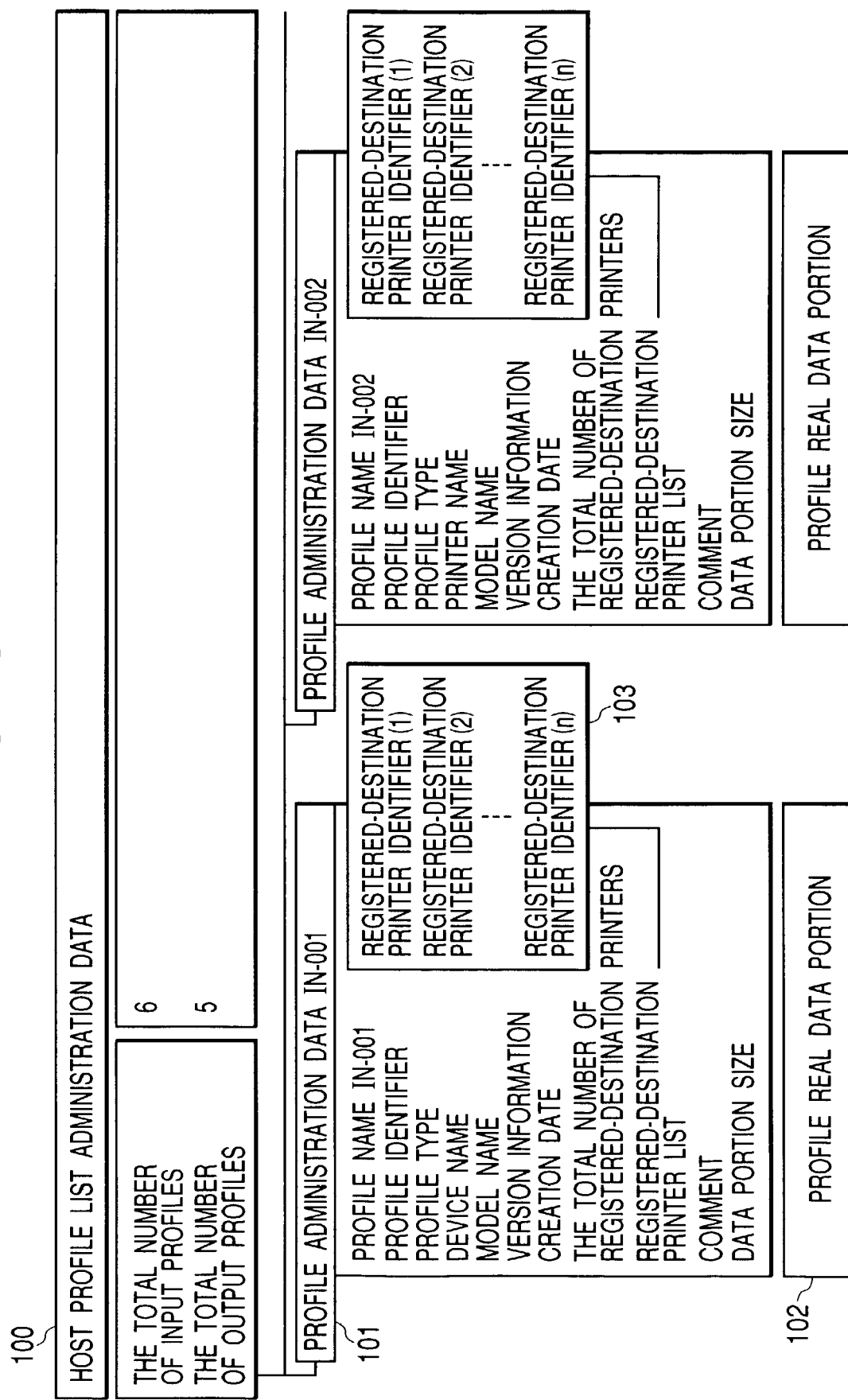

IMAGE PROCESSING METHOD, IMAGE PROCESSING APPARATUS, STORAGE MEDIUM, PROGRAM, AND COLOR IMAGE FORMING SYSTEM

BACKGROUND OF THE INVENTION

1. Field of the Invention

The present invention relates to an image processing method, an image processing apparatus, a storage medium and a program.

2. Related Background Art

Conventionally, in a color image processing system that consists of a host computer and an image forming apparatus (including in that term a printer controller), color profile data for matching a color on the host computer and a print output color with each other is unitarily controlled on the host computer. That is, in the conventional color image processing system the color profile data is not shared and used by plural client computers on a network, but instead is independently controlled by each client computer on the network.

Thus, in the color image processing system as above, every time print outputting is performed utilizing the color profile data for matching the color on the host computer and the print output color with each other, it is necessary for the client computer to incorporate profile information into PDL (page description language) data in the print output and send the obtained PDL code data to the image forming apparatus. This necessity is an impediment to being able to send the PDL code data to the image forming apparatus as efficiently as possible. Moreover, there is room for improvement in conventional ways of effectively controlling the above profile data on plural printers.

SUMMARY OF THE INVENTION

The present invention is made in consideration of such conventional problems as above, and an object thereof is to improve profile control or administration.

Another object of the present invention is to provide a method and a structure for effectively handling profiles.

In order to achieve the above objects, the present invention provides an image processing method in an image processing system to which a client computer and a color image forming apparatus are connected, comprising: a reception step of receiving profile administration data of the color image forming apparatus; an judgment step of judging whether a predetermined output profile does not exist, on the basis of the received profile administration data; and a registration step of registering, in a case where it is judged in the judgment step that the predetermined output profile does not exist, the predetermined output profile on the color image forming apparatus.

Other features of the present invention will be apparent from the following description taken in conjunction with the accompanying drawings.

BRIEF DESCRIPTION OF THE DRAWINGS

FIGS. 5A and 5B are views respectively showing profile list administration data and a registered-destination printer list in the host computer according to the preferred embodiment.

DESCRIPTION OF THE PREFERRED EMBODIMENT

Hereinafter, the preferred embodiment of the present invention will now be described in detail with reference to the accompanying drawings.

A color image forming system according to the preferred embodiment of the present invention consists of plural client computers which are connected on a network, at least one color image forming apparatus which is likewise connected on the network, and a digital color copying machine which is connected to the color image forming apparatus and has a printer output function.

Figure 1:
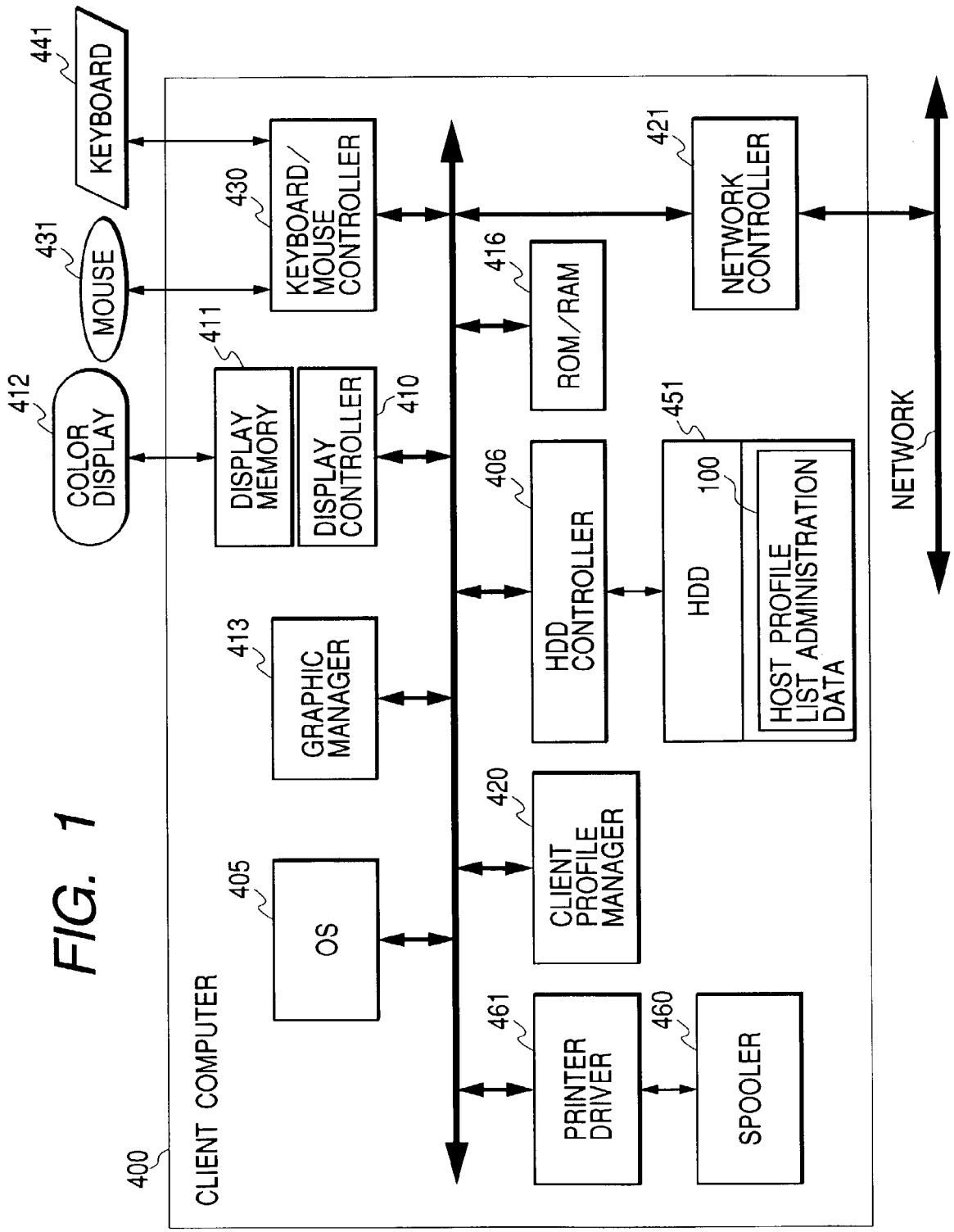
FIG. 1 is a block diagram showing the structure of a client computer according to the preferred embodiment of the present invention.

FIG. 1 is a block diagram showing the structure of a client computer 400.

Figure 2:
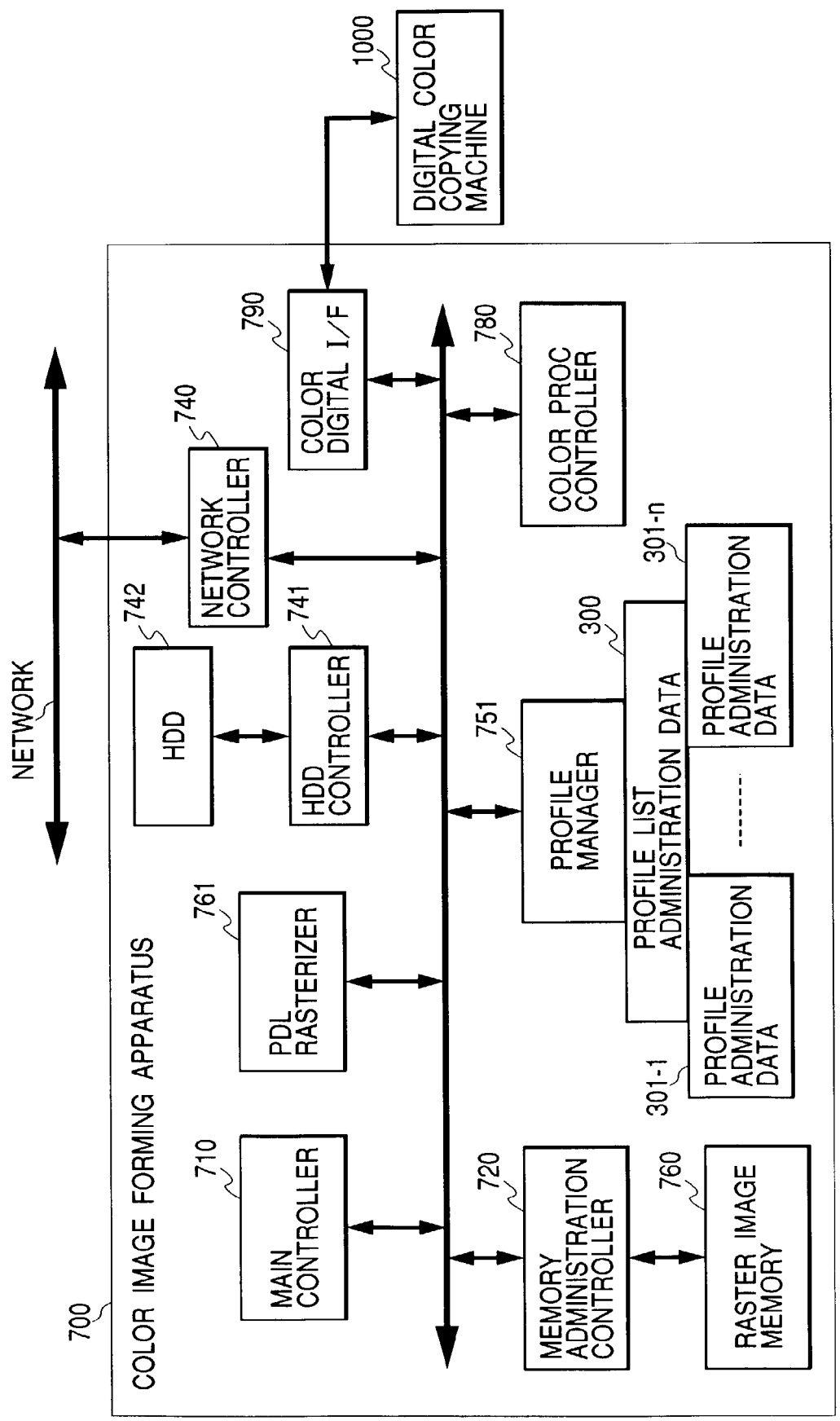
FIG. 2 is a block diagram showing the structure of a color image forming apparatus according to the preferred embodiment.

The client computer 400 consists of a network controller 421 which is used to exchange instruction code data and PDL code data with a color image forming apparatus 700 shown in FIG. 2 through a network, an OS (operating system) 405 which is used to control the client computer 400 as a whole, an HDD (hard disk drive) 451 in which the instruction code data and the PDL code data are temporarily registered and also other various data are stored, an HDD controller 406 which controls the HDD 451, a memory 416 which consists of a ROM and a RAM, a mouse 431 and a keyboard 441 which are used by a user as instruction input means, a keyboard/mouse controller 430 which controls the mouse 431 and the keyboard 441, a color display 412 which displays layouts, editing contents and menus necessary in various image processes, a display memory 411 in which the data to be displayed is stored, a display controller 410 which controls the color display 412, a graphic manager 413 which performs the various image processes on the client computer 400, a display process and a graphic creation process and the like, a printer driver 461 which converts data from application programs on the client computer 400 into PDL code data for a printer output process through the graphic manager 413, and a spooler 460 which performs a spooling process on the PDL code data converted by the printer driver 461.

When the user outputs an image to a printer on the basis of the application program, profile data is incorporated in the PDL code data by the printer driver 461. Here, the profile data is used in a color conversion process to match the tint of a displayed image and the tint of a print-output image with each other, and is stored as host profile list administration data 100 of FIG. 5A in the HDD 451. The profile data is updated, exchanged, administered, controlled and the like by a client profile manager 420.

FIG. 2 is a block diagram showing the structure of the color image forming apparatus 700 according to the illustrated embodiment of the present invention.

Figure 6:
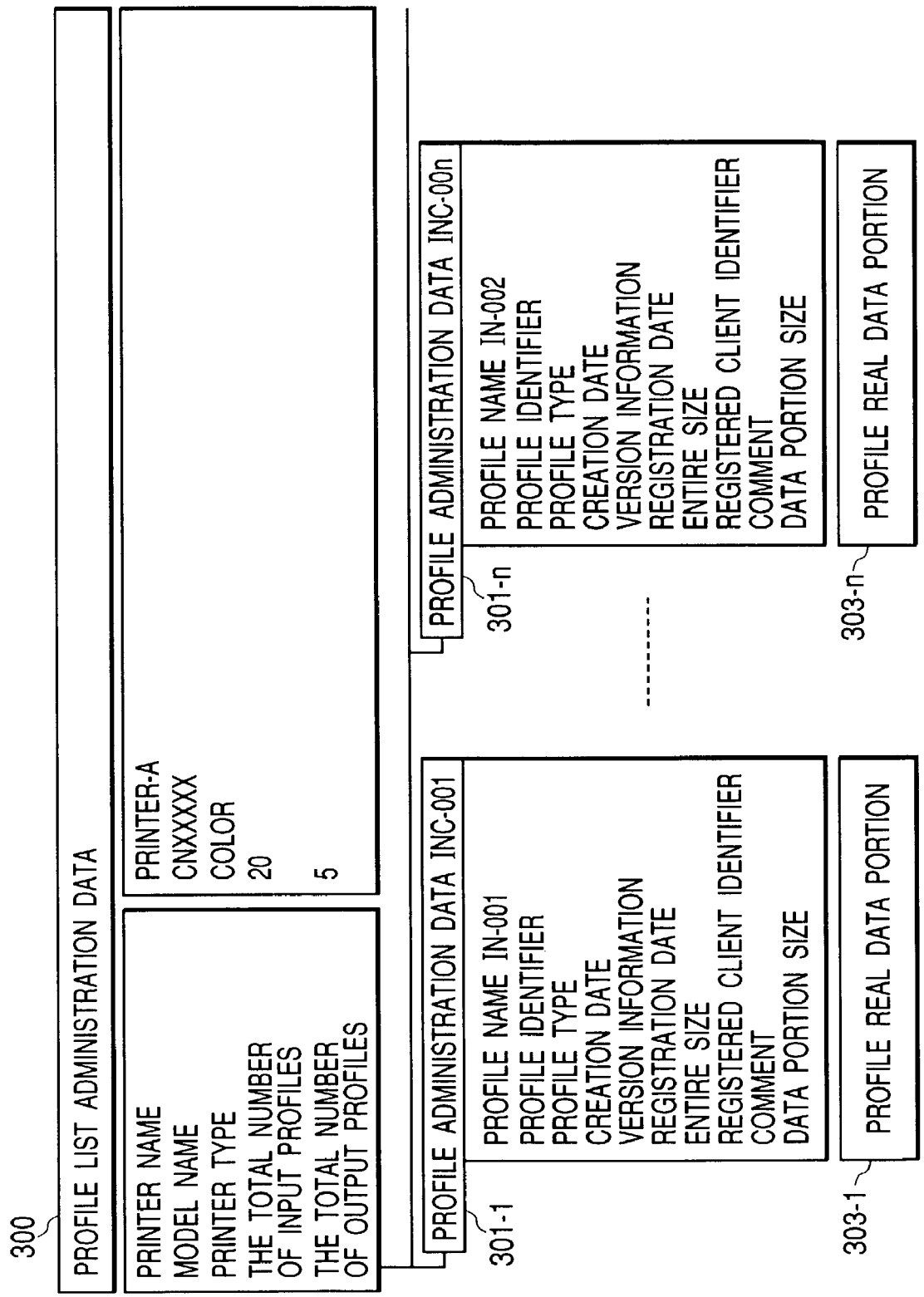
FIG. 6 is a view showing profile list administration data in the color image forming apparatus according to the preferred embodiment of the present invention.

The color image forming apparatus 700 roughly consists of a main controller 710 which controls the apparatus itself as a whole, plural registered profile administration data 301-1, . . . , 301-n shown in FIG. 6, profile list administration data 300 which is used to administer or control the entire structure of these profile administration data, a profile manager 751 which registers, updates, administers or controls the profile administration data and the profile list administration data, a PDL rasterizer 761 which interprets the code of the PDL code data for the printer converted by the printer driver 461 and then converts the interpreted code into a raster image on the basis of a drawing instruction of the client computer 400, an HDD 742 in which the PDL code data sent from the client computer 400 is temporarily stored, an HDD controller 741 which controls the HDD 742, a raster image memory 760 in which the raster image data rasterized for each page is registered, and a memory administration controller 720 which administers or controls the raster image memory 760.

Moreover, in the color image forming apparatus 700, a color processing controller 780 performs as needed a color conversion process according to the contents of designated input/output profile data, by using a profile identifier uniquely determined for the designated color process in the PDL code data. The color processing controller 780 once converts the color data that has been rasterized based on the PDL code data into data in a standardized intermediate color space on the basis of the input profile data representing a designated monitor profile or the like, and then converts the data in the standardized intermediate color space into data in an output color space on the basis of the designated output profile data for the printer.

In addition, as external interfaces, the color image forming apparatus 700 includes a network controller 740 which controls a network process to the network of the client computer 400, and a color digital I/F (interface) 790 which exchanges image data and instruction code data with a digital color copying machine 1000 having a printer output unit.

Hereinafter, an operation procedure for the profile process using the above-structured color image forming system will be described.

<Client's Registration of Input Profile>

The input profile is made up by profile information concerning colors of a monitor used by the user, and the standardized profile data such as an ICC (International Color Consortium) profile or the like. The profile data is supplied from monitor manufacturing corporations or the like and input by, e.g., an operator's input operation through a network such as the Internet or an intranet, a medium such as an external storage means, or the like. Then, the client profile manager 420 of the client computer 400 registers and updates the profile administration data in the host profile list administration data 100 of FIGS. 5A and 5B. First, the client profile manager 420 checks whether or not the format of the designated profile information is a standardized format. At this time, "profile name," "profile type" representing the format type, such as the ICC profile, and whether the profile in question is an input profile or an output profile, "device name" uniquely determined and representing which manufacturer the profile in question belongs to and which profile of that manufacturer the profile in question corresponds to, sub-information, such as "model name" of the device, and discrimination information, such as "creation date," "version information" and the like are obtained from the format information of that format.

Figure 5B:
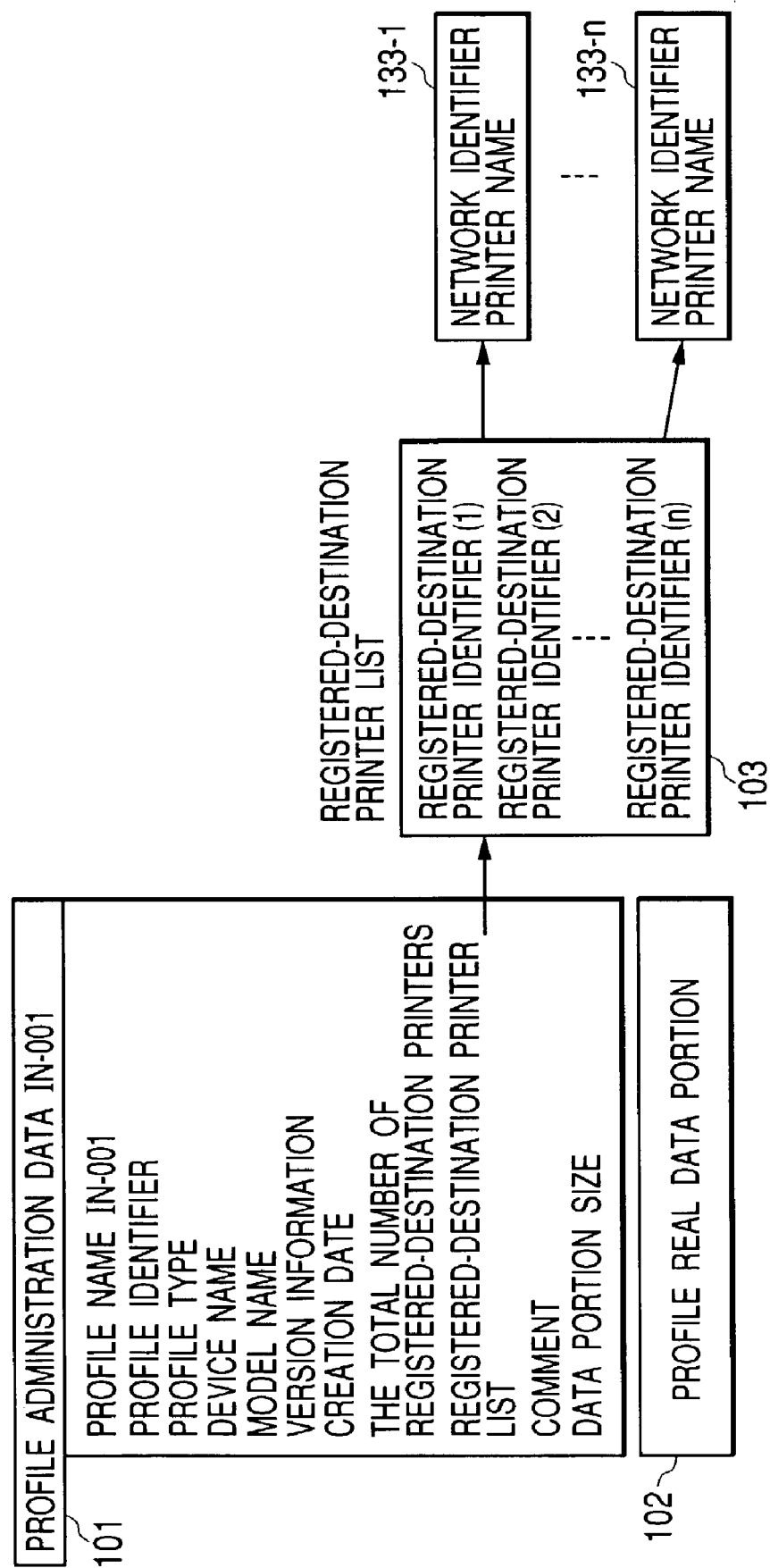

The client profile manager 420 checks profile administration data 101 in the host profile administration data 100 shown in FIGS. 5A and 5B on the basis of the information obtained in this fashion from the format, in a sequential order beginning from profile administration data IN-001, so as to discriminate or judge whether or not the same profile administration data is already present. More specifically, the client profile manager 420 checks the stored profile administration data a number of times equal to the total number of input profiles and of output profiles. Then, if it is found that the same profile administration data is not already present, the previous total number of the existing profiles is counted up, and new profile administration data IN-00$x$ is generated as new profile data, corresponding to the designated profile information, and the client profile manager 420 sets the information obtained from the profile data in the respective fields of "profile name," "profile identifier," "profile type," "device name," "model name," "version information" and "creation date."

Furthermore, the client profile manager 420 sets the size of the real profile data portion to the field of "data portion size" in the profile administration data, and copies the real data portion to a profile real data portion 102.

Here, it should be noted that, since the actual printer to which this profile is applied is not determined yet at this time, the value of the parameter "registered-destination printer identifier" is still null.

<Client's Registration of Output Profile>

The output profile is made up by the information representing the profile of the printer to which the data is output. At the time the printer driver 461 is installed on the client computer 400, this profile information is registered in the host profile list administration data 100 as a default profile of the designated printer.

Here, it should be noted that parameters "profile name," "profile identifier," "profile type," "device name," "model name," "version information" and "creation date" that are not the real data of the output profile have been previously held on an installed application program.

The processing procedure for registering the output profile is as follows. If the installed application program of the printer driver 461 is executed on the OS, it requests the client profile manager 420 to newly generate profile administration data for data output. Then, the client profile manager 420 receives the above parameters such as "profile name" and the like held in the installed application program, and thus sets these parameters respectively to corresponding parameter portions of the newly generated profile administration data. At this time, since there is no real data of the profile, the parameter "data portion size" is registered to be null. Thus, on the client computer 400, there are merely the registration name and the like of the profile, but there is no actual profile data.

<User's Print Execution Process>

When the user print-outputs a color document generated on the client computer 400, the application program issues a trigger for requesting the print process from the OS. Then, the printer driver 461 is called in response to this trigger, and a dialog box for the print output shown in FIG. 3 is opened.

Figure 3:
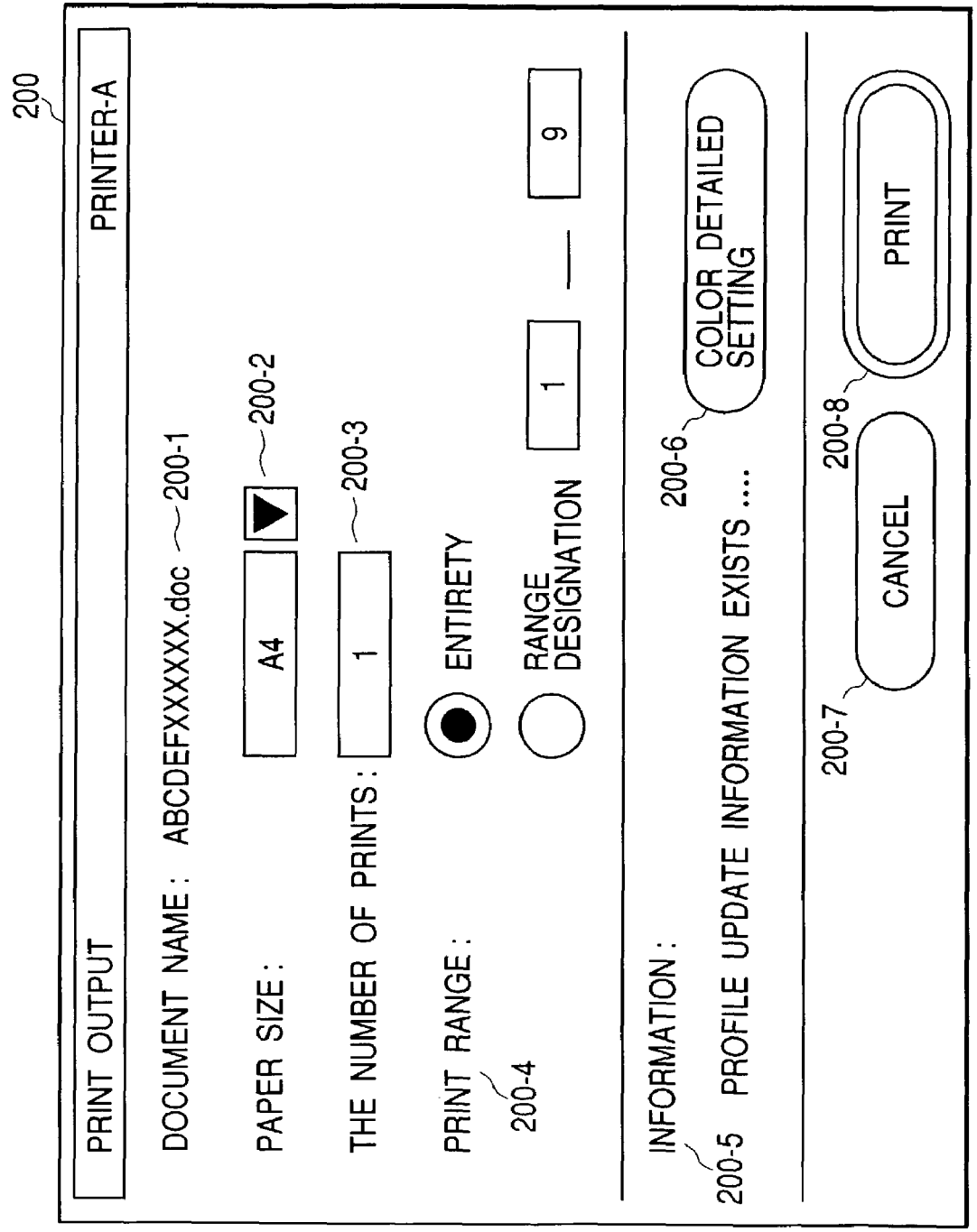
FIG. 3 is a view showing a print dialog box according to that embodiment.

FIG. 3 is a view showing a print dialog box 200 to be displayed by the printer driver 461. The user sets various parameters on the print dialog box 200. That is, the user performs the setting by using a UI such as the mouse or the like on the printer dialog box which includes, as a general printer dialog box, a document name section 200-1 showing the document name on the application program, a paper size section 200-2 to be used to set the size of the paper on which the print output is performed, a section 200-3 to be used to set the number of prints, a print range setting section 200-4 to be used to designate a print page range in a case of printing a document having plural pages or to designate all-page printing, a dialog display button 200-6 to perform the color detailed setting as in the preferred embodiment, an information display section 200-5 showing the current status or state of the printer driver 461, a cancel button 200-7, and a print button 200-8.

<Process of Color Detailed Setting>

Figure 4:
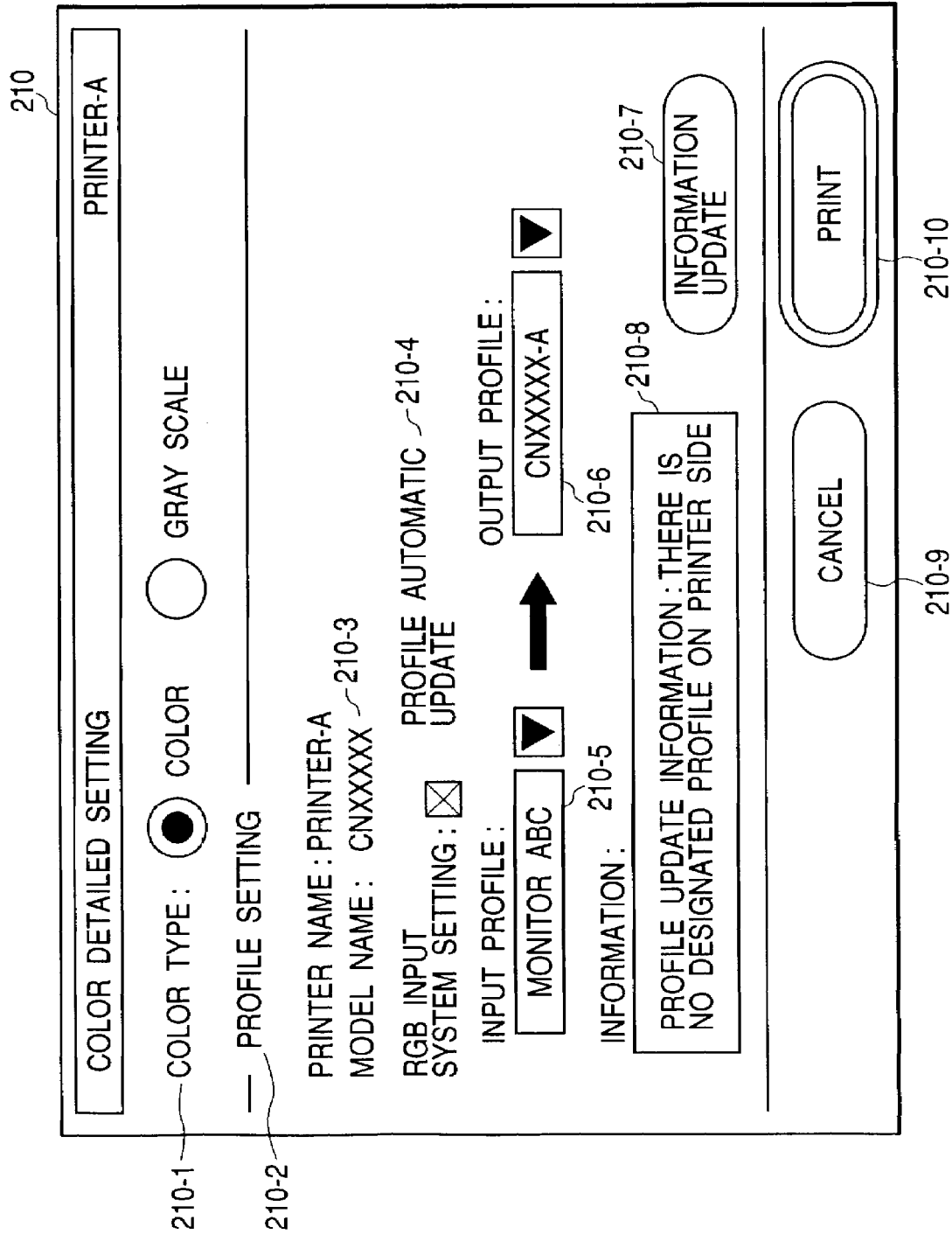
FIG. 4 is a view showing a dialog box in case of color detailed setting according to that embodiment.

When the user intends to perform detailed setting concerning the colors, s/he first depresses the dialog display button 200-6 for performing the color detailed setting, and the printer driver 461 displays a color detailed setting dialog box 210, shown in FIG. 4, on which the various settings concerning the colors are performed.

The color detailed setting dialog box 210 includes a color type section 210-1 on which it is set whether color printing is to be performed or whether printing is to be performed after converting color data into black and white data, and a profile setting section 210-2 which is the feature of the preferred embodiment.

The profile setting section 210-2 includes a printer name section, a model name section 210-3 showing the name of the printer designated on the printer name section, an input profile selection section 210-5, an output profile selection section 210-6, a check box 210-4 on which it is set whether or not the printer (color image forming apparatus) should automatically update the color profile if the color profile data set and requested by the client computer does not exist at the printer (color image forming apparatus) side, an information display section 210-8 on which status information representing the status or state of the color profile or the like is displayed, an information update button 210-7 which is used to intentionally update the status condition of the color profile as communicating with the controller on the side of the printer, a cancel button 210-9, a print button 210-10, and the like.

<Selection of Input Profile>

The user sets the input color profile via the input profile selection section 210-5 provided on the color detailed setting dialog box 210. That is, the list of the input color profiles to be shown in the input profile selection section 210-5 is obtained beforehand from the list of the profile names registered in the host profile list administration data 100 on the client computer 400 by the client profile manager 420 in accordance with the above procedure. This list of input profiles is used as a list of profiles concerning the colors of the monitor used by the user, and the user selects an arbitrary input profile from this list by using an indication device such as a mouse or the like.

<Selection of Output Profile>

The output profile selection section 210-6 to be used to select the output profile data is displayed on the UI by obtaining the list of the output profile names registered in the host profile list administration data 100 from the client profile manager 420 by the printer driver 461 in accordance with the same procedure as that used to obtain the input profile. Thus, the user can select an arbitrary printer output profile on this list by using the mouse or the like.

On one hand, in advance, at a time when the printer driver 461 is called, the color profile list information in the host profile list administration data 100 already registered in the color image forming apparatus of the designated printer is obtained by the printer driver 461 in accordance with a later-described procedure, to obtain the color profile list information registered in the image forming apparatus, and the obtained information is temporarily held in the printer driver 461. Also, when the information update button 210-7 on the color detailed setting dialog box 210 is depressed, the same procedure can be performed as needed.

<Obtaining Color Profile List Information Registered in Image Forming Apparatus>

With respect to the designated color image forming apparatus 700, the printer driver 461 sets the printer name and the model name of the digital color copying machine connected to this color image forming apparatus, and a uniquely determined color profile data list request command in a communication packet, and then sends the communication packet to the color image forming apparatus 700 that has the designated unique network identifier, through the network controller 421.

The main controller 710 of the color image forming apparatus 700 analyzes the contents of a series of such communication packets sent from a network manager and discriminates the request command from the client computer 400.

Here, if the list request command is one that seeks the color profile data already registered in the color image forming apparatus 700, then the main controller 710 instructs the profile manager 751 to transmit the profile list administration data 300 to the client computer side. The profile manager 751 administers or controls the profile list administration data 300 having the structure shown in FIG. 6 in the color image forming apparatus 700, and checks the designated printer name and its model name in the request packet sent from the client computer and the printer name and its model name respectively corresponding to the designated names in the profile list administration data 300. If these names coincide, the profile manager 751 sets the parameters "profile name," "profile identifier," "profile type," "creation date" and "registration date" in one or more profile administration data INC-001, INC-002, . . . in a communication packet of a uniquely determined color profile data list return command, in a number equal to the total number of input profiles and of output profiles. Then, the profile manager 751 sends the resulting communication packet to the client computer 400 from which the color profile data list request command was received, through the network controller 740, whereby the printer driver 461 obtains the list.

<In a Case Where There is No Color Profile Data in the Target Image Forming Apparatus>

The printer driver 461 compares the input and output profiles designated by the user's actuation of the above dialog display button 200-6 with the input and output profiles on the profile administration list sent from the color image forming apparatus 700 and designated to be checked as to whether the same profile names already exist, based on the color profile data list request command.

Here, if there is no profile in the color image forming apparatus 700 that is the same as these profiles, a registration process for registering the color profile in the color image forming apparatus 700 is performed.

<Registration of Color Profile in Color Image Forming Apparatus>

If it is discriminated or judged in the above procedure that there is no designated profile in the color image forming apparatus 700, the printer driver 461 performs the process designated at the check box 210-4 for the automatic updating of the color profile on the color detailed setting dialog box 210.

<In a Case Where Profile Automatic Updating is OFF>

If the check box 210-4 for the automatic update of the color profile is OFF, the information representing that there is no designated profile on the printer side is displayed on the information display section 210-8. When the printing process is executed in this state, a default input or output profile in the color image forming apparatus 700 is used.

<In a Case Where Profile Automatic Updating is ON>

If the check box 210-4 for the automatic update of the color profile is ON, the printer driver 461 sets the printer name and its model name uniquely determined on the network of the target printer of the digital color copying machine connected to the color image forming apparatus 700, and sets the corresponding profile administration data and the profile real data portion in the host profile list administration data 100 in regard to the color profile data that has been selected by the user and that does not already exist in the color image forming apparatus 700, in a communication packet of a uniquely determined color profile data registration command, and sends the resulting communication packet to the color image forming apparatus 700 that has the designated unique network identifier, through the network controller 421.

The main controller 710 of the color image forming apparatus 700 analyzes the communication packet of the color profile data registration command sent through the network controller 740, and instructs the profile manager 751 to register the profile data sent from the client computer 400.

The profile manager 751 checks the target printer name in the communication packet, and sequentially retrieves from the profile administration data INC-001, the profile administration data of which the profile identifier coincides with the profile that the client computer 400 has requested to be registered, for the total number of the input and output profiles. Thus, the profile manager 751 confirms that there is no matching (same) profile administration data.

By means of this retrieval process, if the color profile data sent from the client computer 400 is not yet registered in the color image forming apparatus 700, the profile manager 751 discriminates or judges whether the color profile data represents an input profile or an output profile, on the basis of the parameter "profile type" in the profile administration data of the client computer set in the communication packet, and then increments the total number of the corresponding profiles. Moreover, the profile manager 751 sets the parameters "profile name," "profile identifier," "profile type," "creation date," and "device name" on the basis of the profile administration data of the client computer that has been extracted as above. Furthermore, the profile manager 751 sets the data of registration, including "registration date," sets the data size of the profile real data portion in the communication packet to "data portion size," and sets the client identifier uniquely discriminated on the network of the client computer to "registered client identifier."

Then, the profile data of the profile real image data portion in the communication packet is copied to profile read data portions 303-1, . . . , 303-$n$.

On one hand, if the color profile data designated by the user on the client computer does not exist in the color image forming apparatus 700 to which the designated printer is connected, the color profile data on the client computer is registered in the profile list administration data 300 in the color image forming apparatus by a series of the above processes.

Thus, at a time when the color profile data is registered in the color image forming apparatus 700, the network controller 740 of the color image forming apparatus 700 sends back to the client computer 400 a communication packet that includes the identifier representing that the registration process has succeeded, whereby the printer driver 461 on the client computer 400 side confirms that the profile has been registered in the color image forming apparatus 700 on the printer side.

<Update of Printer Identifier of Printer in Which Profile has Been Registered, on Client Computer>

If the process based on the color profile data registration command has succeeded, the printer driver 461 selects, in the host profile list administration data 100, the target profile administration data corresponding to the profile data designated by the user in the client computer 400 for the client profile manager 420 as shown in FIG. 5B, increments "the total number of the registered-destination printers" in the selected profile administration data, and writes the printer identifier of the printer of the digital color copying machine for which the registration is performed and to which the color image forming apparatus 700 is connected, in a registered-destination printer list 103.

Each of printer identifiers 133-1, . . . , 133-$n$ of the printer(s) in which the profile has been registered consists of the printer name uniquely determined on the network and the network identifier. On the basis of the data in the registered-destination printer list 103, it is possible to judge that one set of profile data information has been registered in plural printers.

After the process based on the color profile data registration command has succeeded, the printer driver 461 writes the network identifier of the color image forming apparatus 700, in which the profile has been registered, to "registered-destination printer identifier" of the target profile administration data in the host profile list administration data 100. The network identifier acts as a flag representing that the profile has been registered in the color image forming apparatus 700 of the designated printer.

<Process for Generating PDL Code Data of Printer Driver>

After each parameter on the dialog box of the printer driver 461 has been set, if the user depresses the print button 200-8 by using the indication device such as the mouse or the like, the printer driver 461 requests the graphic manager 413 to output the data from the user's application program. Thus, the data from the user's application program is interfaced with a standardized graphic drawing instruction through the graphic manager 413, and the graphic drawing instruction is converted into PDL code data by the printer driver 461.

<Incorporation of Color Profile Setting Command into PDL Code Data>

Before the graphic drawing instruction from the graphic manager 413 is converted into the PDL code data, the printer driver 461 sets the profile names of the input and output profiles designated on the dialog box by the user respectively as the parameters of input and output profile designation commands uniquely determined in the PDL command, thereby creating a PDL operator of the color conversion portion of the PDL code data.

Then, the color profile setting commands and the PDL operator are listed in the stream of the PDL code data. At this time, the profile data designated by the user has already been registered in the color image forming apparatus 700 by the printer driver 461, and the real data portion of the profile thus need not be incorporated in the stream of PDL code data every time. Thus, it is possible to send the PDL code data more efficiently than in conventional systems.

<Process of Conversion into PDL Code Data>

The printer driver 461 consecutively converts the graphic drawing instruction(s) sent from the graphic manager 413 into the PDL code data to perform streaming of the PDL code data, and then transmits the PDL code data to the spooler 460 as needed. Here, the spooler 460 performs a process to store the PDL code data stream converted by the printer driver 461.

The stored PDL code data stream is divided into plural communication packets and transmitted through the network controller 421 to the color image forming apparatus 700 that has the previously, uniquely determined printer that is the process target of the printer driver 461.

Here, a previously and uniquely determined print execution command has been set in the communication packet, the data portion of the PDL code data stream is divided into plural portions and set in the communication packet, and the communication packet is then transmitted to the color image forming apparatus 700 through the network.

<Registration of PDL Code Data in Color Image Forming Apparatus>

The main controller 710 of the color image forming apparatus 700 obtains the above communication packet for the print execution from the client computer which has executed a print job, through the network controller 740, and discriminates or judges that the obtained communication packet represents a command to request print execution. Then, the main controller 710 extracts, as needed, the data portion of the PDL code data from the transmitted plural communication packets including the PDL code data, and registers the PDL code data in the HDD 742 through the HDD controller 741.

<Process of Rasterizing of PDL Code Data in Color Image Forming Apparatus>

The main controller 710 causes the PDL rasterizer 761 to perform a process to create a raster image on the basis of the PDL code data previously registered in the HDD 742.

The PDL rasterizer 761 reads the PDL code data from the HDD 742 as needed, and analyzes the read PDL code data. Then, if a specific color process is necessary for the PDL code data, the color processing controller 780 performs that color process on the image data rasterized by the PDL rasterizer 761, and the memory administration controller 720 finally registers the image data rasterized from the PDL code data in the raster image memory 760.

<Extraction of Profile Setting Command in PDL Code Data>

In analyzing the PDL code data, the PDL rasterizer 761 detects "input profile command" described on the PDL code data by the printer driver 461 on the client computer 400 according to the above procedure, "input profile name" being the value of the parameter "input profile command." Similarly, the PDL rasterizer 761 detects "output profile command" described on the PDL code data, "output profile name" being the value of the parameter "output profile command."

Moreover, the PDL rasterizer 761 causes the profile manager 751 to check, based on the profile name designation on the PDL code data detected in the above procedure, whether or not the respective input and output profiles have been registered in the profile list administration data 300 in the color image forming apparatus 700.

<Input and Output Profile Setting of Color Processing Controller>

The profile manager 751 sequentially compares the profile administration data INC-001, INC-002, . . . , in the profile list administration data 300, of which the profile name coincides with the profile name designated in the PDL code data from the client computer 400, for the total number of the input and output profiles. Then, if there is profile administration data the profile name of which coincides with the designated profile name, the profile manager 751 sets the profile type and the profile real data portion of the corresponding profile administration data in the color processing controller 780 as input and output profiles of the color processing controller.

At this time, the profile name that is the value of the parameter of the command operator on the PDL code data designated at the client computer may be a uniquely predetermined key code, or may be obtained by checking whether the profile manager 751 is coincident in the print system.

If there is no designation of the profile on the PDL code data, uniquely predetermined profile data is set as default data in the color processing controller 780.

<Output from Digital Color Copying Machine>

Thus, the image data rasterized from the PDL code data is converted into data in the standardized color space by using a series of input profiles through the color conversion controller, and the resulting converted image data is further converted into data in the printer color space by using the output profile, and the image data converted from the PDL code data by using the profiles is registered for each page in the raster image memory 760. At the time when the image of one page is created, the main controller 710 transmits the uniquely determined print execution command to the digital color copying machine 1000 having the printer unit through the color digital I/F 790, and likewise transmits the previously generated image data of one page through the color digital I/F 790. Thus, the printer unit of the digital color copying machine 1000 performs the output process.

The color image forming apparatus 700 is incorporated in the above digital color copying machine, and thus can be used as a unified apparatus. Thus, if one digital color copying machine is directly connected to the network, the digital color copying machine can process as a printer the PDL code data sent from the client computer.

Thus, it is possible to achieve a system in which the printer driver downloads and registers the profile data in the printer controller at specific timing, and then incorporates the identifier in the PDL code data when the profile data is registered, without having to incorporate the color profile data in the PDL code data on the client host computer every time a print process is instructed. As a result, the size of the body of output data sent from the client computer can be made smaller, and the profiles can be unitarily administered or controlled.

As above, when the printer driver performs the print output, the profile list administration data administered in the printer is compared with the profile administration data in the client computer. Thus, if the profile data is not registered, it is possible to register the profile data automatically. Moreover, it is possible to link and administer the profile list administration data administered in the plural printers on the network and profile data for one profile on one client computer together, whereby it is possible to effectively register the profiles when the printer driver performs the print output.

Another Embodiment

The above embodiment includes hardware that constitutes the network. However, the above embodiment can alternatively be achieved by means of software that sequentially performs the respective data processes.

That is, it is needless to say that the present invention can be achieved in a case where a storage medium (or a recording medium) storing the program codes of software for realizing the functions of the above embodiment is supplied to a system or an apparatus and then a computer (or CPU or MPU) in the system or the apparatus reads and executes the program codes stored in the storage medium. In this case, the program codes themselves read from the storage medium realize the functions of the above embodiment, and the storage medium storing such the program codes constitutes the present invention. Besides, the program codes can be written and stored in various storage media such as a CD, an MD, a memory card, an MO and the like.

Moreover, it is needless to say that the present invention includes not only a case where the functions of the above embodiment are realized by the execution of the program codes read by the computer, but also a case where an OS (operating system) or the like operating on the computer executes all the process or a part thereof according to the instructions of the program codes, thereby realizing the functions of the above embodiment.

Moreover, it is needless to say that the present invention includes a case where the program codes read from the storage medium are once written in a memory provided in a function expansion board inserted in the computer or a function expansion unit connected to the computer, and then a CPU or the like provided in the function expansion board or the function expansion unit executes all the process or a part thereof according to the instructions of the program codes, thereby realizing the functions of the above embodiment.

As described above, according to the present invention, it is possible to achieve a system in which the printer driver downloads and registers the profile data in the printer controller at a specific timing, and then incorporates the identifier in the PDL code data when the profile data is registered, without having to incorporate the color profile data in the PDL code data on the client host computer every time. As a result, the size of the body of output data sent from the client computer can be made smaller, and also the profiles can be unitarily administered or controlled.

As many apparently widely different embodiments of the present invention can be made without departing from the spirit and scope thereof, it is to be understood that the invention is not limited to the specific embodiments thereof expect as defined in the appended claims.

What is claimed is:

1. An image processing method in an image processing system to which a client computer and at least one color image forming apparatus are connected, the color image forming apparatus preparing an image for outputting by means of a printer, said method performed by the client computer and comprising the steps of:
    displaying to a user a list of profiles available on the client computer;
    receiving profile administration data from the color image forming apparatus;
    judging whether a predetermined profile is non-existent in the color image forming apparatus, on the basis of the received profile administration data;
    in a case where it is judged in said judging step that the predetermined profile is non-existent in the color image forming apparatus, registering the predetermined profile on the color image forming apparatus;
    adding a respective printer identifier of each of one or more printers connected to the color image forming apparatus on which the predetermined profile has been registered, to a registration destination printer list to be used in judging whether the predetermined profile in the client computer is registered in each of the printers; and
    incrementing the total number of the registered-destination printers for the registered output profile.

2. An image processing method according to claim 1, wherein the predetermined profile is a profile designated on an operation unit of the client computer.

3. An image processing method according to claim 1, further comprising the steps of:
    receiving an instruction from the client computer instructing that an image is to be printed; and
    in response to the instruction, and in accordance with information in PDL (page-description language) data according to the image, subjecting image data representing the image to color conversion by using the registered profile.

4. An image processing method according to claim 1, further comprising the steps of:
    receiving an instruction from the client computer instructing that an image is to be printed; and
    in a case where setting of a driver to execute said image processing method is a setting according to which the profile is not to be updated, performing color conversion on data representing the image in response to the instruction by using a default profile of the color image forming apparatus, without performing the registration of the profile.

5. An image processing method according to claim 1, wherein whether to perform the registration of the profile or not is displayed on a display unit of the client computer.

6. An image processing method according to claim 1, wherein the predetermined profile is an output profile and includes a real data portion.

7. An image processing apparatus to which at least one color image forming apparatus is connected, the color image forming apparatus preparing an image for outputting by means of a printer, said image processing apparatus comprising:
    display means for displaying to a user a list of profiles available on the client computer;
    reception means for receiving profile administration data from the color image forming apparatus;
    judgment means for judging whether a predetermined profile is non-existent in the color image forming apparatus, on the basis of the received profile administration data;
    processing means for registering the predetermined profile on the color image forming apparatus in a case where it is judged by said judgment means that the predetermined profile is non-existent in the color image forming apparatus;
    writing means for adding a respective printer identifier of each of one or more printers connected to the color image forming apparatus to a registration destination printer list to be used in judging whether the predetermined profile in the client computer is registered in each of the printers, and
    incrementing means for incrementing the total number of the registered-destination printers for the registered profile.

8. A computer-readable storage medium which stores executable codes of a computer program for causing a client computer to perform a process in an image processing system to which the client computer and at least one color image forming apparatus are connected, the color image forming apparatus preparing an image for outputting by means of a printer, said codes including:
    a code for displaying to a user a list of profiles available on the client computer;
    a code for receiving profile administration data from the color image forming apparatus;
    a code for judging whether a predetermined profile is non-existent in the color image forming apparatus, on the basis of the received profile administration data;

a code for registering the predetermined profile on the color image forming apparatus in a case where it is judged that the predetermined profile is non-existent in the color image forming apparatus;

a code for adding a respective printer identifier of each of one or more printers connected to the color image forming apparatus on which the predetermined output profile has been registered, to a registration destination printer list to be used in judging whether the predetermined profile in the client computer is registered in each of the printers; and a code for incrementing the total number of the registered-destination printers for the registered output profile.

9. A color image forming system which comprises a color image forming apparatus capable of using a PDL (page description language) on a network, and at least one client computer connected to the network, said color image forming apparatus preparing an image for outputting by means of a printer, wherein said color image forming apparatus comprises:
means for outputting image data;
means for analyzing a specific PDL and converting the analyzed specific PDL into a raster image;
means for analyzing a content of a specific color profile and converting the image according to the analyzed content; and
means for administrating a list table of at least one color profile,
wherein said list table consists of information functioning as a key for retrieving the specific color profile and a real data portion of the profile, and wherein said client computer comprises:
means for displaying to a user a list of profiles available on the client computer;
means for converting a graphic language on the client computer into the specific PDL;
means for administrating a list table of at least one color profile; and
means for holding data of the color profile,
wherein said list table consists of information functioning as a key for retrieving the specific color profile and a real data portion of the profile, and wherein said color image forming system further comprises:
means for comparing the color profile of said client computer and the color profile in said color image forming apparatus with each other on the basis of specific key information, said comparison means performing the comparison of the color profiles at processing timing of converting the graphic language on said client computer into the specific PDL;
means for registering the color profile in said color image forming apparatus at the processing timing of converting the graphic language on said client computer into the specific PDL, in a case where it is found based on the result of the comparison that color profile information of said client computer and color profile real data are non-existent in said color image forming apparatus;
means for generating a specific PDL operator to designate the color profile in a PDL code based on a specific key code, in accordance with the result of the comparison by said comparison means; and
means for adding a respective printer identifier of each of one or more printers connected to said color image forming apparatus on which the predetermined profile has been registered, to a registration destination printer list to be used in judging whether the predetermined profile in the client computer is registered in each of the printers; and
means for incrementing the total number of the registered-destination printers for the registered profile.

10. A color image forming system according to claim 9, further comprising means for causing a user to select specific color profile information on said client computer on the basis of specific key information.

11. A color image forming system according to claim 9, wherein, if the list table information of the color profile on said client computer has the information functioning as the key for performing the retrieval, the real data portion of the color profile corresponding to the key may be null.

12. A color image forming system according to claim 9, wherein said color image forming apparatus is constructed for incorporation in a color copying machine.

13. A color image forming system which comprises a color image forming apparatus capable of using a PDL (page description language) on a network, and at least one client computer connected to the network, said color image forming apparatus preparing an image for outputting by means of a printer, wherein said color image forming apparatus comprises:
means for outputting image data;
means for analyzing a specific PDL and converting the analyzed specific PDL into a raster image;
means for analyzing a content of a specific color profile and converting the image according to the analyzed content;
means for administrating a list table of at least one color profile; and
means for holding data of the color profile,
wherein said list table consists of information functioning as a key for retrieving the specific color profile and a real data portion of the profile, and wherein said client computer comprises:
means for displaying to a user a list of profiles available on the client computer;
means for converting a graphic language on the client computer into the specific PDL;
means for administrating a list table of at least one color profile; and
means for holding data of the color profile,
wherein said list table consists of information functioning as a key for retrieving the specific color profile and a real data portion of the profile, and wherein said color image forming system further comprises:
means for comparing the color profile of said client computer and the color profile in said color image forming apparatus with each other on the basis of specific key information, said comparison means performing the comparison of the color profiles at arbitrary timing;
means for registering the color profile in said color image forming apparatus at arbitrary timing in a case where it is found based on the result of the comparison that color profile information of said client computer and color profile real data are non-existent in said color image forming apparatus;
means for generating a specific PDL operator to designate the color profile in a PDL code based on a specific key code, in accordance with the result of the comparison by said comparison means;
means for adding a respective printer identifier of each of one or more printers connected to the color image forming apparatus on which the predetermined profile has been registered, to a registration destination printer list to be used in judging whether the predetermined profile in the client computer is registered in each of the printers; and means for incrementing the total number of the registered-destination printers for the registered profile.

14. An image processing method performed by a client computer and comprising the steps of:

displaying to a user a list of profiles available on the client computer;

administering profile list administration data registration of which can be updated in a color image forming apparatus, the color image forming apparatus preparing an image for outputting by means of a printer;

administering profile administration data in the client computer;

comparing the two profile list administration data with each other;

registering profile data of the client computer in a printer on the basis of the result in said comparing step;

incorporating specific information for designating the registered profile data in a PDL;

adding a respective printer identifier of each of one or more printers connected to the color image forming apparatus on which the predetermined profile has been registered, to a registration destination printer list to be used in judging whether the predetermined profile in the client computer is registered in each of the printer; and incrementing the total number of the registered-destination printers for the registered profile.

15. An image processing method in an image processing system to which a client computer and at least one color image forming apparatus are connected, the color image forming apparatus preparing an image for outputting by means of a printer, said method being performed by the client computer and comprising the steps of:

displaying to a user a list of profiles available on the client computer;

receiving profile administration data from the color image forming apparatus;

in a case where it is judged based on the profile administration data received in said receiving step that a predetermined output profile is non-existent in the color image forming apparatus, registering the predetermined output profile in the color image forming apparatus;

holding the result of registration in said registering step in the client computer;

adding a respective printer identifier of each of one or more printers connected to the color image forming apparatus on which the predetermined profile has been registered, to a registration destination printer list to be used in judging whether the predetermined profile in the client computer is registered in each of the printers; and incrementing the total number of the registered-destination printers for the registered profile.

16. An image processing method according to claim 15, wherein the client computer registers that the predetermined color profile has been registered in the at least one color image forming apparatus, as a registered-destination printer list.

* * * * *